US007427232B2

(12) United States Patent
Schmidt et al.

(10) Patent No.: US 7,427,232 B2
(45) Date of Patent: Sep. 23, 2008

(54) CLEAN GRAIN AND TAILINGS CONVEYING SYSTEM FOR AN AGRICULTURAL COMBINE

(75) Inventors: James R. Schmidt, Andale, KS (US); Jonathan E. Ricketts, Ephrata, PA (US); Robert A. Matousek, Milan, IL (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 11/900,570

(22) Filed: Sep. 12, 2007

(65) Prior Publication Data

US 2008/0006013 A1 Jan. 10, 2008

Related U.S. Application Data

(62) Division of application No. 11/411,513, filed on Apr. 26, 2006, now Pat. No. 7,297,051.

(51) Int. Cl.
*A01F 12/30* (2006.01)
(52) U.S. Cl. ....................................... 460/93
(58) Field of Classification Search ............. 460/93, 460/66, 85, 69, 78, 101, 114, 80, 108; 56/14.6; 209/241, 243, 247, 257
See application file for complete search history.

(56) References Cited

U.S. PATENT DOCUMENTS

| 104,004 | A | 6/1870 | Farquhar | |
|---|---|---|---|---|
| 3,537,460 | A | 11/1970 | Van Buskirk | 130/27 |
| 3,589,111 | A | 6/1971 | Gullickson | 56/12.8 |
| 3,680,291 | A | 8/1972 | Soteropulos | 56/14.3 |
| 4,244,380 | A * | 1/1981 | DePauw et al. | 460/108 |
| 4,428,182 | A | 1/1984 | Allen et al. | 56/14.6 |
| 4,492,237 | A | 1/1985 | Pakosh | 130/27 R |
| 4,572,215 | A | 2/1986 | Pakosh | 130/27 R |
| 4,611,605 | A * | 9/1986 | Hall et al. | 460/80 |
| 4,739,773 | A * | 4/1988 | West et al. | 460/16 |
| 4,884,994 | A | 12/1989 | Hall et al. | 460/66 |
| 4,907,402 | A | 3/1990 | Pakosh | 56/14.6 |
| 4,976,654 | A | 12/1990 | Dammann et al. | 460/80 |
| 5,021,029 | A | 6/1991 | Usick | 460/85 |
| 5,830,061 | A | 11/1998 | Voss et al. | 460/70 |
| 6,233,911 | B1 | 5/2001 | Dillon | 56/14.6 |
| 2003/0186731 | A1* | 10/2003 | Voss et al. | 460/101 |

* cited by examiner

*Primary Examiner*—Árpád Fábián-Kovács
(74) *Attorney, Agent, or Firm*—Michael G. Harms; John William Stader; Patrick M. Sheldrake

(57) ABSTRACT

A clean grain and tailings conveying system for an agricultural combine, including a pan fixedly mounted beneath a lowermost sieve of a cleaning system. The pan includes a tailings receiving portion disposed below a peripheral edge portion of the sieve, for receiving tailings which fall downwardly from the edge portion during operation of the sieve, and a clean grain receiving portion disposed beneath the sieve for receiving clean grain which falls downwardly therethrough during the operation of the sieve. The pan includes at least one elongate collecting conveyor including a clean grain collecting portion which extends longitudinally through the clean grain receiving portion of the pan, and a tailings collecting portion which extends longitudinally through the tailings receiving portion, for separately receiving and collecting the clean grain and the tailings received by the pan, and conveying the clean grain and tailings to transfer conveyors that can also be part of the pan.

8 Claims, 4 Drawing Sheets

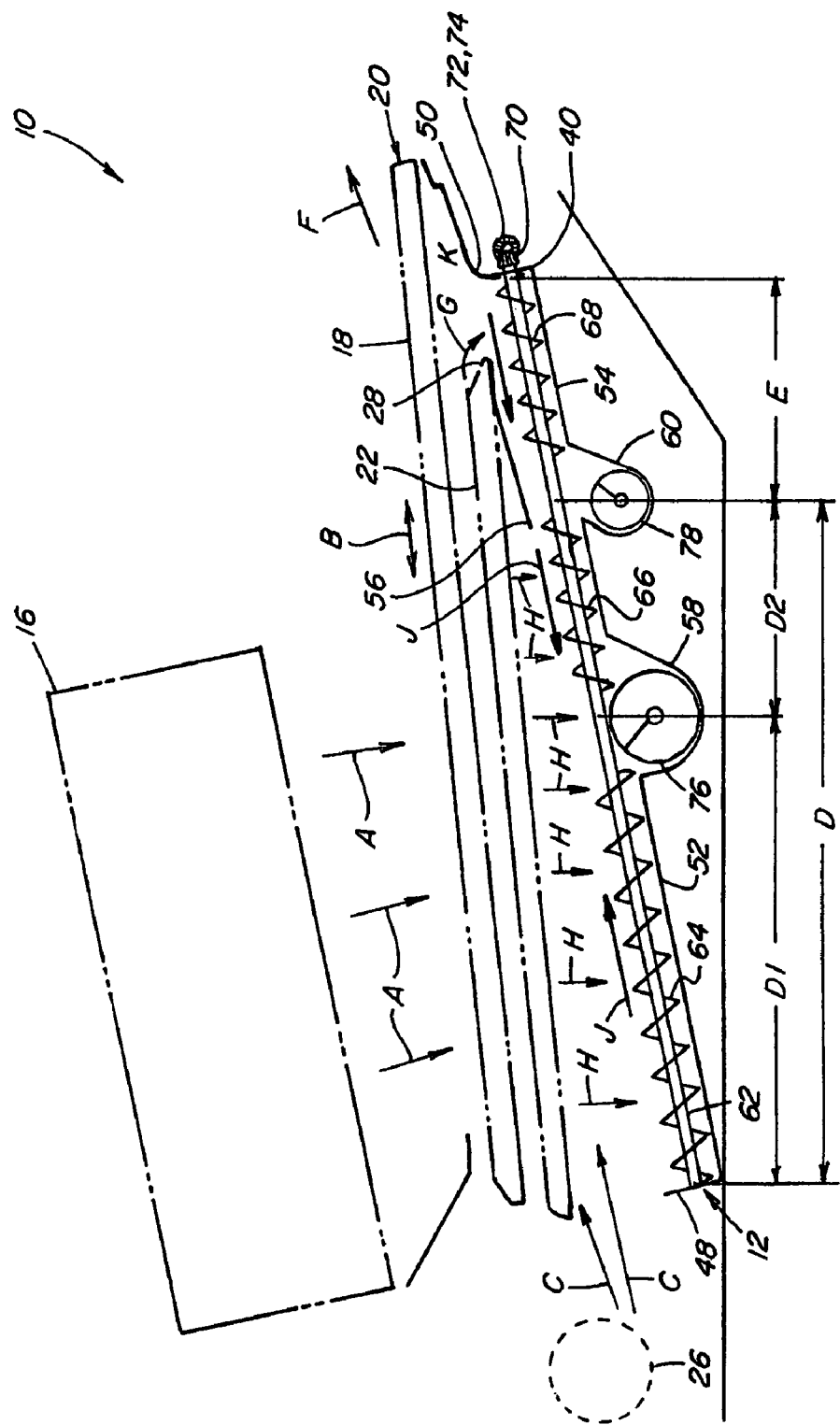

CLEAN GRAIN AND TAILINGS CONVEYING SYSTEM FOR AN AGRICULTURAL COMBINE

This divisional application claims priority under 35 U.S.C. §120 from U.S. patent application Ser. No. 11/411,513 filed on Apr. 26, 2006, now U.S. Pat. No. 7,297,051 by James R. Schmidt et al. with the same title, the full disclosure of which is hereby incorporated by reference.

TECHNICAL FIELD

This invention relates generally to clean grain conveying and tailings conveying in an agricultural combine, and more particularly, to a system which utilizes a common drive and conveyor apparatus for conveying of both clean grain and tailings.

BACKGROUND ART

Agricultural combines typically have a rotary threshing or separating system for separating grain from larger elements of harvested crops, such as straw, stalks and the like. The grain and smaller elements of crop material, which can include, for instance, pod or cob fragments, typically fall from the separating system directly onto a vibratory cleaning system disposed therebelow, or, onto one or more conveyors for conveyance to the cleaning system Reference Van Buskirk, U.S. Pat. No. 3,537,460 issued to International Harvester Company; and also Hall et al. U.S. Pat. No. 4,884,994 issued to Deere and Company, both of which illustrate well known internal combine conveyor systems.

The cleaning system typically includes sieves or shoes which are reciprocally moved, usually in the fore and aft directions, for cleaning or sifting the grain from tailings and material other than grain (MDG). Clean grain falling through the sieves drops onto one or more clean grain pans disposed therebelow, which pan or pans are typically inclined downwardly toward a sidewardly extending clean grain auger conveyor. The clean grain auger conveyor receives the clean grain and delivers it to an elevator which carries the clean grain up to a clean grain tank.

During the vibration of the sieves, air is blown upwardly and rearwardly therethrough, so as to carry lighter elements of the MDG, or chaff, away. Heavier elements and tailings too large to fall through the sieves and too heavy to be blown away are carried by the vibrations rearwardly along the surfaces of the sieves so as to fall over the rear edges thereof, onto a tailings pan located below the rear edges. The tailings pan is located below the clean grain pan and is similarly inclined downwardly and forwardly, and extends to a sidewardly extending tailings auger conveyor, which carries the tailings to a tailings return conveyor operable for carrying the tailings upwardly, back to the cleaning or separating system of the combine, for reprocessing.

To facilitate material flow along the clean grain pan and the tailings pan, in some combine models, those pans are connected to at least one of the sieves, so as to be correspondingly vibrated therewith. A problem that has arisen, however, with this arrangement, is that it is a burden on the drive which vibrates this assembly, so as to cause premature wear and failure of the drive. This arrangement is also costly and complex.

Therefore, what is sought is a conveyor arrangement for clean grain and tailings handling in a combine, which overcomes one or more of the problems set forth above.

SUMMARY OF THE INVENTION

What is disclosed is a clean grain and tailings conveying system for an agricultural combine, which overcomes one or more of the problems set forth above.

According to a preferred aspect of the invention, what is disclosed is a clean grain and tailings conveying system for an agricultural combine, which includes a pan adapted to be fixedly mounted to a combine beneath a lowermost sieve of a cleaning system thereof. The pan includes a tailings receiving portion disposed below a peripheral edge portion of the sieve, for receiving tailings which fall downwardly from the edge portion during operation of the sieve, and a clean grain receiving portion disposed beneath the sieve for receiving clean grain which falls downwardly therethrough during the operation of the sieve. The pan includes at least one elongate collecting trough including a clean grain collecting portion which extends longitudinally through the clean grain receiving portion of the pan, and a tailings collecting portion which extends longitudinally through the tailings receiving portion, for separately receiving and collecting the clean grain and the tailings received by the pan. The system additionally includes a clean grain transfer conveyor in connection with the clean grain collecting portion of the collecting trough, and a tailings transfer conveyor in connection with the tailings collecting portion of the collecting trough. An elongate helical auger is supported in and extends longitudinally through the collecting trough, the auger being rotatable in a predetermined rotational direction about a longitudinally extending rotational axis, for simultaneously and separately conveying clean grain contained in the clean grain collecting portion of the collecting trough to the clean grain transfer conveyor, and tailings contained in the tailings collecting portion of the collecting trough to the tailings transfer conveyor.

As an advantage of the conveying system of the invention, the pan, as well as the collecting conveyor and transfer conveyors, are supported separate of the cleaning system, and thus are not vibrated therewith, with the attendant disadvantages that can occur therefrom, as discussed above. Additionally, the clean grain and tailings processed by the conveying system of the invention are positively moved or conveyed, instead of relying on the past practice of using vibration and gravity for the movement thereof.

As another preferred aspect of the invention, a plurality of the collecting troughs extend in side-by-side relation fore and aft along the pan, so as to effectively occupy substantially all of the area beneath the lowermost sieve of the cleaning system. And, as another preferred aspect of the invention, the clean grain transfer conveyor and the tailings transfer conveyor are disposed below and extend across the collecting troughs at spaced locations therealong. This enables the clean grain and tailings transfer conveyors to connect to a conventional clean grain elevator and tailings processing system of a combine. As still another preferred aspect of the invention, the pan can be inclined upwardly toward a location spaced beneath the peripheral edge portion of the sieve, so as to be capable of being accommodated in the lower region of a conventionally constructed combine.

According to still another preferred aspect of the invention, the auger extending through the collecting trough includes a helical flight extending therearound in a first rotational direction and disposed in the clean grain collecting portion of the collecting trough, and another helical flight extending around the auger in a second rotational direction and disposed in the tailings collecting portion of the collecting trough, such that when the auger is rotated, clean grain and tailings collected in the collecting trough will be conveyed in opposite directions toward the clean grain transfer conveyor and the tailings transfer conveyor, respectively. Further in this regard, additional auger flights can be provide in the respective clean grain and tailings portions, and directed in either rotational direction, as desired or required, for conveying clean grain and tailings to the transfer conveyors, for a particular application.

BRIEF DESCRIPTION OF THE DRAWINGS

FIG. 4 is simplified schematic side view of elements of the conveying system of the invention.

DETAILED DESCRIPTION OF THE INVENTION

Figure 1:
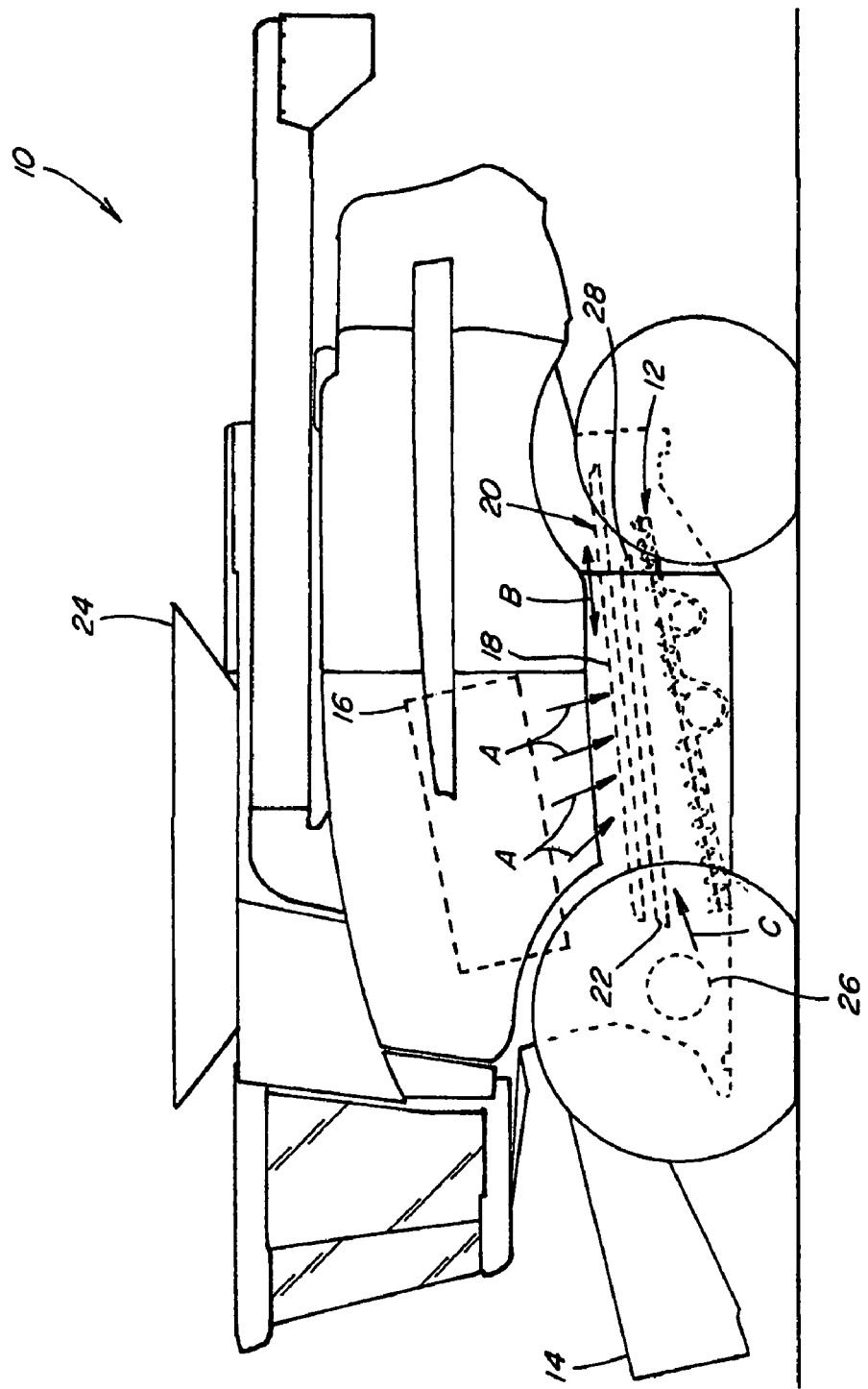
FIG. 1 is a simplified side view of an agricultural combine including a clean grain and tailings conveying system of the invention.

Referring now to the drawings, wherein like numbers refer to like parts, in FIG. 1, an agricultural combine 10 is shown, including a clean grain and tailings conveying system 12 constructed and operable according to the teachings of the present invention.

Combine 10 is of conventional, well known construction, including a feeder house 14 on a front end thereof, to which is connectable a header (not shown), operable for severing a swath of crops from a field as combine 10 is moved forwardly thereover, and conveying the severed crops to feeder house 14. Feeder house 14 includes an internal conveying system (not shown), for conveying the crops upwardly and rearwardly into the body of combine 10, into an inlet of a separating or threshing system 16 of the combine. Threshing system 16 generally includes a rotary rotor at least partially enclosed in a concave defining an arcuate space therebetween, and in which space the crop material is processed, for separating grain, and material other than grain (MDG), from straw, the straw being ejected rearwardly from the threshing system through the rear end of the combine for deposition on the field, in the well known manner. The grain and MDG will fall, and/or be conveyed, onto an upper sieve 18 of a cleaning system 20 located within the body of combine 10, as denoted generally by arrows A, located below separating system 16. Upper sieve 18 includes openings therethrough, which are sized for allowing the grain, and smaller elements of MDG, to fall therethrough onto a lower sieve 22 of cleaning system 20. Lower sieve 22 will have smaller openings therethrough compared to upper sieve 18, such that the sieves 18 and 22 provide a progressive cleaning mechanism for separating clean grain from the MDG. The clean grain which falls through lower sieve 22 is desired to be collected and conveyed to a grain tank 24.

To facilitate the flow of the clean grain through sieves 18 and 22, the sieves are vibrated or reciprocally moved, typically in a fore and aft direction, as denoted by arrow B. At the same time, air from a fan 26 is blown upwardly and rearwardly through sieves 18 and 22. The combination of this air flow and vibratory movement, results in the smaller grain being sifted through the sieves 18 and 22, whereas lighter elements of the MDG, referred to also as chaff, are blown upwardly and rearwardly away from sieves 18 and 22. This chaff is either blown into an optional chaff spreader (not shown), which is operable for distributing the chaff over a desired swath of the field from which the crop is cut; or it is directed into an optional chopper (also not shown), for mixing with straw for chopping and distribution thereby; or it is directed downwardly onto the field through a rear opening of the combine, all in the well known manner. Larger elements of MDG which are unable to pass through upper sieve 18 are moved to the rear peripheral edge portion thereof by the vibratory movements thereof, and will fall therefrom, either onto the field therebelow, or chopped and/or spread. Typically, the sieves are adjusted, such that smaller elements of MDG, also ref erred to as tailings, which are still likely to contain grain, are allowed to pass through the upper sieve 18, but not lower sieve 22. On sieve 22, the tailings are moved by the vibratory movements toward a rear peripheral edge portion 28 of sieve 22, and fall thereover.

Figure 2:
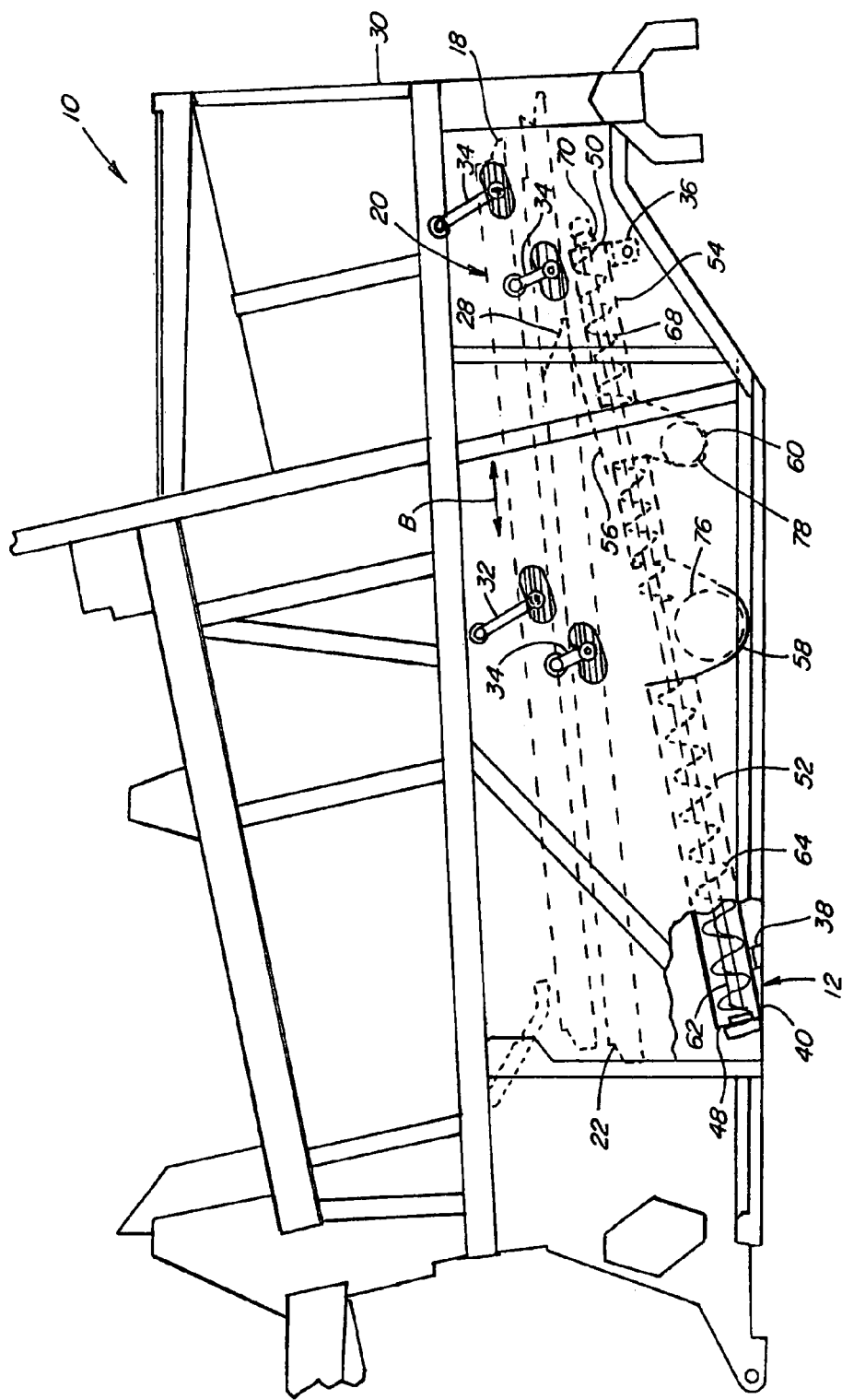
FIG. 2 is a simplified side view of a structural frame of the combine of FIG. 1, illustrating the conveying system of the invention, and mounting thereof in connection with the frame.
Figure 3:
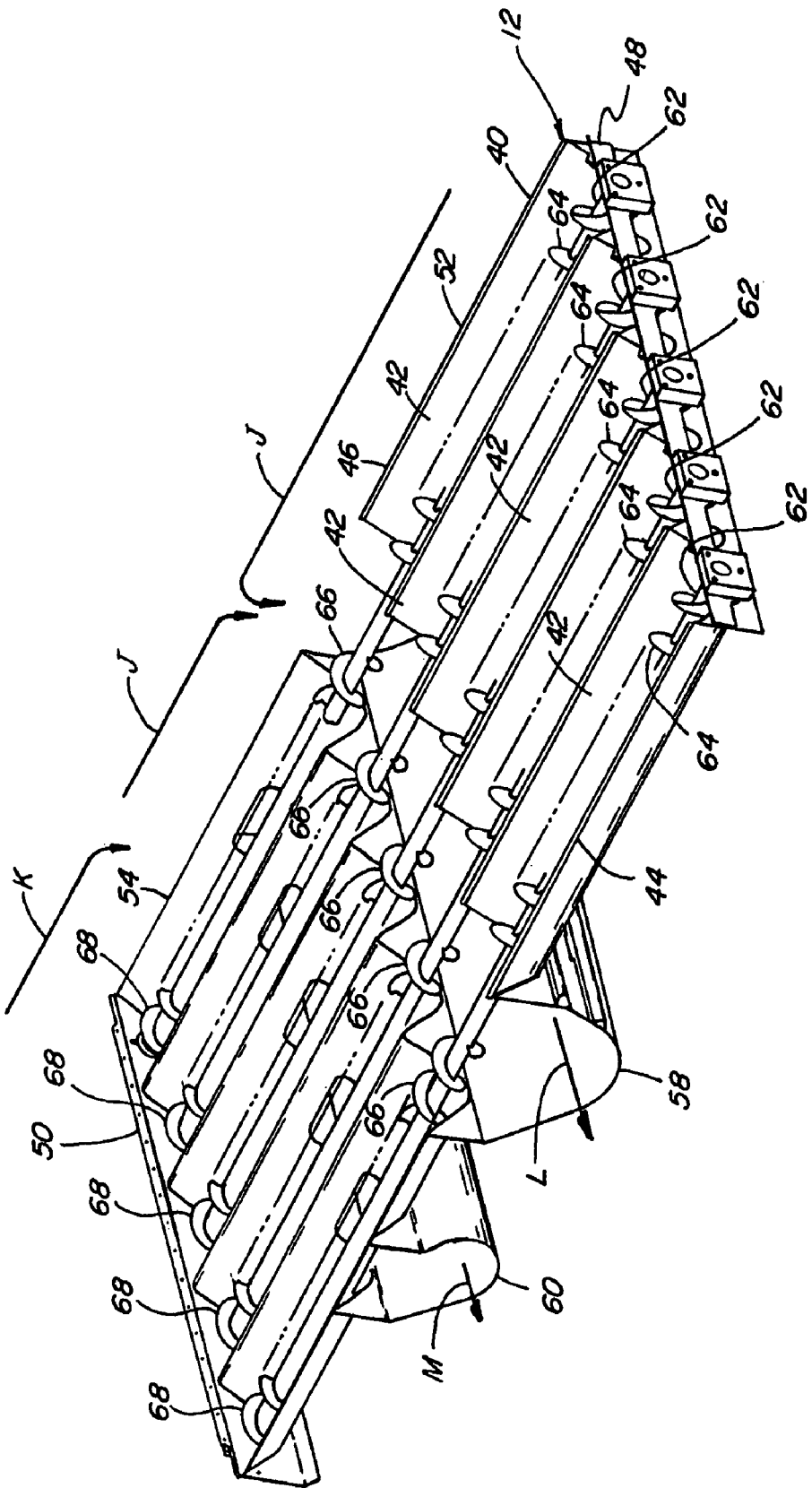
FIG. 3 is a perspective view of the conveying system of the invention.

Referring also to FIGS. 2, 3 and 4, clean grain and tailings conveying system 12 of the invention is shown in association with various aspects of threshing system 16 and cleaning system 20. More particularly referring to FIG. 2, sieves 18 and 22 are illustrated as being suspended from a structural frame 30 of combine 10 by pivoting support arms 32 and 34, respectively, for the reciprocal fore and aft movement, as denoted by arrow B, as effected by a suitable drive mechanism (not shown), in the well known manner. Clean grain and tailings conveying system 12, in contrast, is illustrated as being fixedly connected or mounted to structural frame 30, below lower sieve 22, by brackets 36 and 38, so as to be immovable relative to structural frame 30. This is advantageous, as it eliminates the additional loading on cleaning system 20, including on support arms 32 and 34 and the drive mechanism therefor, which, as pointed out above, has been found to be a problem.

FIGS. 3 and 4 best illustrate the construction and operation of clean grain and tailings conveying system 12 of the invention. Conveying system 12 generally includes a pan 40 which is fixedly mounted to structural frame 30 by brackets 36 and 38, so as to be located directly beneath lower sieve 22 of cleaning system 20, including beneath peripheral edge portion 28 of lower sieve 22 (FIG. 2). Pan 40 preferably includes a plurality or array of side-by-side elongate collecting troughs 42, extending across the width of pan 40, between opposite side edges 44 and 46 thereof, as best illustrated in FIG. 3. Collecting troughs 42 preferably extend in the fore and aft direction, between a forward edge 48 of pan 40, and a rear edge 50. Each collecting trough 42 has a clean grain receiving portion 52, located beneath those regions of lower sieve 22 through which clean grain is expected to fall, and a tailings receiving portion 54, positioned directly beneath peripheral edge portion 28 of lower sieve 22 (FIG. 2). As best shown in FIG. 4, clean grain receiving portion 52 has an overall fore and aft extent, denoted by arrow D, and tailings receiving portion 54 has an overall fore and aft extent denoted by arrow E. The extent of clean grain receiving portion 52 is further subdivided into a forward clean grain receiving region, generally having a fore and aft extent denoted D1, and a rear clean grain receiving region, having an extent D2.

Referring more particularly to FIG. 4, in operation, as grain and MDG is flowing downwardly from threshing system 16 onto upper sieve 18, denoted by arrows A, that sieve, and lower sieve 22, are being reciprocally moved, as denoted by arrow B. Simultaneously, fan 26 is operated to generate upward and rearward air flows, denoted by arrows C, which blow through the openings through sieves 18 and 22, to carry chaff rearwardly, away from cleaning system 20, as denoted by arrow F. At the same time, tailings are allowed to pass through the openings of upper sieve 18, but not those of lower sieve 22. The tailings are moved by vibration rearwardly along the surface of lower sieve 22, until they reach peripheral edge portion 28, which is the rear edge of sieve 22, where they fall therefrom, as denoted by arrow G. The tailings, denoted by arrow G, will fall onto tailings receiving portion 54 of pan 40, which is located directly below edge portion 28. Clean grain will be allowed to pass through lower sieve 22, as denoted by arrows H, so as to fall onto clean grain receiving portion 52 of pan 40. Some of the clean grain will typically fall onto clean grain receiving portion 52 in the forward region D1, and some will fall in the rear region D2. Here, it should be noted that a deflector shield 56 is disposed beneath the rear end portion of sieve 22, to deflect clean grain which falls therethrough forwardly, so as to fall onto clean grain receiving portion 52 of pan 40, as opposed to tailings receiving portion 54 located below the rear end.

Pan 40 additionally preferably forms and includes a clean grain transfer conveyor trough 58 disposed below and in connection with clean grain receiving portion 52, and a tailings transfer conveyor trough 60 disposed below and in connection with tailings receiving portion 54. An elongate, helical auger 62 is supported in each collecting trough 42, so as to extend longitudinally in the fore and aft direction therealong, continuously through both the clean grain receiving portion 52 and the tailings receiving portion 54. Each auger 62 includes a first helical auger flight 64 extending in a first predetermined direction therearound through the forward clean grain receiving portion D1 of pan 42; and a second helical auger flight 66 extending in a second rotational direction therearound, opposite the first rotational direction, through the region D2, and through the tailings receiving portion 54. Each auger 62 is connected to a drive mechanism operable for rotating it, here the mechanism being illustrated as including a bevel gear 70 on the rear end of auger 62, which gear is enmeshed with a bevel gear 72 on a drive shaft 74 which extends sidewardly across the rear end of pan 40, so as to jointly rotate augers 62. Drive shaft 74 can be rotated by any suitable drive, such as, but not limited to, a belt, chain or shaft, in connection with a power plant of combine 10 (not shown).

When augers 62 are rotated in a predetermined rotational direction, flights 64, 66 and 68 will convey clean grain and tailings separately and simultaneously along collecting troughs 42, and into clean grain transfer conveyor trough 58, and tailings transfer conveyor trough 60, as illustrated by arrows J and K, respectively. Clean grain transfer conveyor trough 58 contains a helical auger 76, and tailings transfer conveyor trough 60 contains an auger 78, which augers are rotatable in the conventional manner using suitable drives (not shown) for conveying the clean grain and tailings to a clean grain elevator (not shown) and a tailings return system (also not shown), as illustrated by arrows L and M in FIG. 3, in the well known manner.

As a result of the clean grain and tailings conveying system of the invention as represented by the embodiment 12, stresses on the support structure for the cleaning system and on the cleaning system itself, can be significantly reduced. And, clean grain and tailings generated by a cleaning system can be more positively distributed, respectively, to the clean grain tank and tailings return system, or other locations, efficiently, and effectively, which may provide increased throughput rates compared to use of gravity and vibration alone.

While the present invention has been described with reference to certain preferred embodiments, one of ordinary skill in the art will recognize that additions, deletions, substitutions, modifications and improvements can be made while remaining within the spirit and scope of the present invention as defined by the appended claims.

What is claimed is:

1. An agricultural combine, comprising:
   a separating system including a rotor and a concave;
   a cleaning system including at least one sieve disposed below the separating system for receiving a flow of crop material therefrom, and a fan operable for generating a flow of air upwardly through the sieve for carrying elements of chaff upwardly away from the sieve, the sieve being configured for allowing downward passage of clean grain of the crop material therethrough, and the sieve including a peripheral edge portion over which tailings can fall; and
   a conveying system disposed below the sieve and configured for separately receiving clean grain which passes downwardly therethrough and tailings which fall over the peripheral edge thereof, and jointly but separately conveying the clean grain and the tailings to a clean grain transfer conveyor, and a tailings transfer conveyor, respectively, wherein the conveying system includes a plurality of troughs containing helical augers disposed above and in connection with the clean rain transfer conveyor and the tailings transfer conveyor, the augers being operable for simultaneously conveying clean grain and tailings separately along the troughs into the clean grain and tailings transfer conveyors, respectively.

2. The combine of claim 1, wherein the conveying system includes a plurality of collecting troughs extending in side by side relation below the sieve.

3. The combine of claim 1, wherein each of the augers includes a helical flight extending therearound in a first rotational direction, and a helical flight extending therearound in a second rotational direction, such that when the auger is rotated, clean grain and tailings will be conveyed in opposite directions.

4. The combine of claim 3, wherein the auger includes a helical flight extending therearound in the second rotational direction and disposed for conveying clean grain along the auger in the same direction as the tailings.

5. An agricultural combine, comprising:
   separating system including a rotor and a concave;
   a cleaning system including at least one sieve disposed below the separating system for receiving a flow of crop material therefrom, and a fan operable for generating a flow of air upwardly through the sieve for carrying elements of chaff upwardly away from the sieve, the sieve being configured for allowing downward passage of clean grain of the crop material therethrough, and the sieve including a peripheral edge portion over which tailings can fall; and
   a conveying system including a plurality of auger conveyors disposed below the sieve and configured for separately receiving clean grain which passes downwardly through the sieve and tailings which fall over the peripheral edge thereof, and jointly but separately conveying the clean grain and the tailings to a clean grain transfer conveyor, and a tailings transfer conveyor, respectively.

6. The combine of claim 5, wherein the auger conveyors are disposed above and in connection with the clean grain transfer conveyor and the tailings transfer conveyor, respectively.

7. The combine of claim 5, wherein each of the auger conveyors includes an auger having a helical flight extending therearound in a first rotational direction, and a helical flight extending therearound in a second rotational direction, such that when the auger is rotated, clean grain and tailings will be conveyed in opposite directions.

8. The combine of claim 7, wherein the auger includes a helical flight extending therearound in the second rotational direction and disposed for conveying clean grain along the auger in the same direction as the tailings.

* * * * *